United States Patent
Yu et al.

(10) Patent No.: US 8,358,933 B2
(45) Date of Patent: Jan. 22, 2013

(54) OPTICAL SIGNAL SIDEBAND MILLIMETER-WAVE SIGNAL GENERATION FOR SUPER-BROADBAND OPTICAL WIRELESS NETWORK

(75) Inventors: Jianjun Yu, Princeton, NJ (US); Ting Wang, West Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 662 days.

(21) Appl. No.: 12/562,353

(22) Filed: Sep. 18, 2009

(65) Prior Publication Data

US 2011/0069964 A1    Mar. 24, 2011

(51) Int. Cl.
*H04B 10/00* (2006.01)
(52) U.S. Cl. .......................................... 398/115
(58) Field of Classification Search ............... 398/115
See application file for complete search history.

(56) References Cited

U.S. PATENT DOCUMENTS

| | | | |
|---|---|---|---|
| 7,362,927 B1* | 4/2008 | Ilchenko et al. | 385/15 |
| 2003/0198477 A1* | 10/2003 | Kuri et al. | 398/183 |
| 2010/0329680 A1* | 12/2010 | Presi et al. | 398/79 |

* cited by examiner

*Primary Examiner* — Danny Leung
(74) *Attorney, Agent, or Firm* — Joseph Kolodka

(57) ABSTRACT

An optical wireless network includes an optical coupler for diverting received millimeter-wave signals comprised of an optical carrier and second order sidebands into multiple transmission paths; a downstream optical path being one of the multiple transmission paths and including an optical filter for filtering passing through the optical carrier with a single sideband, a converter for converting the optical carrier and single sideband to a corresponding electrical signal for amplification and broadcast transmission from an antenna; and an upstream path being one of the multiple transmission paths and having a filter for passing through the optical carrier only from the mm-wave signals and an intensity modulator driven by data received over the antenna to modulate the optical carrier for optical transmission to a receiving destination.

6 Claims, 1 Drawing Sheet

OPTICAL SIGNAL SIDEBAND MILLIMETER-WAVE SIGNAL GENERATION FOR SUPER-BROADBAND OPTICAL WIRELESS NETWORK

BACKGROUND OF THE INVENTION

The present invention relates generally to optical systems, and more particularly, to optical single sideband millimeter wave generation for a super-broadband, optical wireless network.

Radio-over-fiber (ROF) techniques, the integration of optical and wireless systems, have become an attractive solution for increasing the capacity, bandwidth, and mobility to serve both fixed and mobile users. It also simplifies the configuration of the base station (BS) because the millimeter wave (mm-wave) signals will be generated and controlled in the central office (CO). Many optical mm-wave generation approaches have been reported, such as direct modulation, optical double-frequency heterodyning, external intensity modulation, and so on, but they have not been satisfactory. Direct modulation is limited by the laser chirp and the optical heterodyne technique is plagues by a lower frequency response and the quality of the mm-wave signals depends on the coherence of the two laser lightwaves in the optical heterodyning scheme. The external intensity modulation scheme can generate optical mm-wave signals with a simplified transmitter in the CO. Different modulation formats, such as double-sideband (DSB), single-sideband (SSB) and optical carrier suppression (OCS) can be generated by the external modulation scheme. However, due to fiber dispersion, DSB modulation experiences performance-fading problem and OCS modulation has the limitation of transmission distance, which shorter than 60 km if the 2.5 Gbit/s signal is carried by the 40 GHz optical carrier. To overcome fiber dispersion, the SSB modulation appears to be a viable option.

Accordingly, there is a need for a method of optical millimeter-wave generation using a single sideband modulation (SSB) that overcomes fiber dispersion and other limitations of previous techniques.

SUMMARY OF THE INVENTION

In accordance with the invention, there is provided an optical wireless network including an optical coupler for splitting received millimeter-wave signals comprised of an optical carrier and second order sidebands into multiple transmission paths; a downstream optical path being one of the multiple transmission paths and including an optical filter for filtering passing through the optical carrier with a single sideband, a converter for converting the optical carrier and single sideband to a corresponding electrical signal for amplification and broadcast transmission from an antenna; and an upstream path being one of the multiple transmission paths and having a filter for passing through the optical carrier only from the mm-wave signals and an intensity modulator driven by data received over the antenna to modulate the optical carrier for optical transmission to a receiving destination.

In an alternative aspect of the invention, a method in an optical wireless network includes the steps of: i) splitting received millimeter-wave signals comprised of an optical carrier and second order sidebands into first and second transmission paths; ii) over the first transmission path, passing through only the optical carrier with a single sideband from the millimeter wave signals, iii) converting the optical carrier and single sideband to a corresponding electrical signal for amplification and broadcast transmission from an antenna; and iv) over the second transmission path, passing through the optical carrier only from the mm-wave signals received to be modulated by an intensity modulator according to data received over the antenna for optical transmission to a receiving destination.

In a preferred embodiment, the received millimeter-wave signals are generated with the frequency of the optical carrier being a multiple of a local oscillator LO frequency used to generate the millimeter wave signals. Alternatively, the received millimeter-wave signals are generated with the frequency of the optical carrier being double of a local oscillator LO frequency used to generate the millimeter wave signals. Preferably, the received millimeter-wave signals are generated by an intensity modulator biased at a top peak output power when a local oscillator LO signal used to generate the millimeter wave signals is removed.

BRIEF DESCRIPTION OF DRAWINGS

These and other advantages of the invention will be apparent to those of ordinary skill in the art by reference to the following detailed description and the accompanying drawings.

DETAILED DESCRIPTION

The invention is directed to an optical wireless network employing a novel front-end optical apparatus for generating an optical mm-wave with a low LO frequency and a low bandwidth requirement for the modulator to generate the single sideband SSB mm-wave signal.

Figure 1:
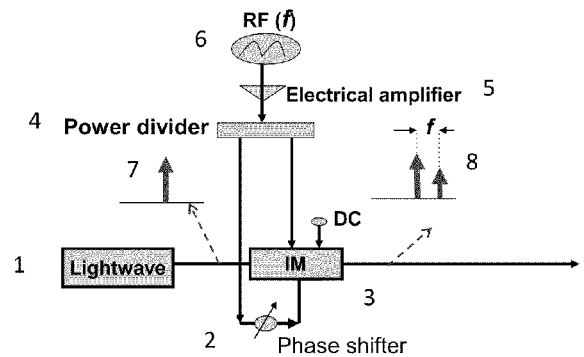
FIG. 1 is a diagram of an optical apparatus for generating a single side-band millimeter wave.

FIG. 1 shows a scheme for generating an optical SSB mm-wave signal. A lightwave 1 is fed into the intensity modulator IM that is DC biased and responsive to a phase shifter 2 that is fed from a power divider 4 acting on an amplified 5 radio frequency signal 6. The common characteristic of SSB mm-wave generation is that the electrical local oscillator (LO) frequency for generating the optical mm-wave is the same as that of the spacing between optical carrier and first-order sidebands while the modulator is biased DC at quadrature point and a phase difference of $\pi/2$ is applied by the phase shifter 2. For example, for a 40-GHz optical mm-wave generation, the RF or local oscillator (LO) frequency is 40 GHz, and the bandwidth for the modulator is also required for 40 GHz. FIG. 1 shows that the intensity modulator has dual-arms. Each arm is driven by the RF signal 6 with the same frequency but they have 90 degree phase shifter 2. The DC is biased at $\pi/2$.

Figure 2:
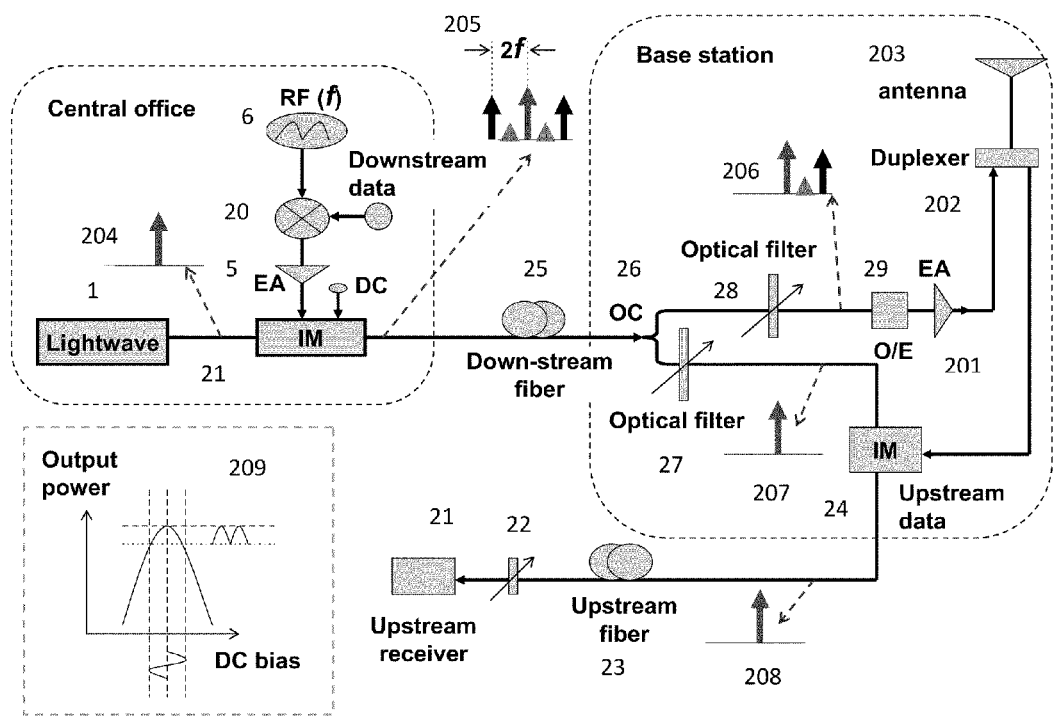
FIG. 2 is diagram of an exemplary optical communication system employing a front-end millimeter-wave signal generator in accordance with the invention.

Referring now to FIG. 2, there is shown an exemplary radio-over-fiber ROF network employing a front-end for generating optical mm-wave signals in accordance with the invention. In a central office, a $LiNbO_3$ intensity modulator (IM) 21 is employed to generate an optical mm-wave, from a lightwave source 1, 204, with a low frequency of the radio-frequency (RF) driver 6. Downstream data and an RF signal 6 at half of LO frequency are mixed 20, amplified 5 and used to drive the intensity modulator IM 21. To realize an optical mm-wave carrier with double that of the LO frequency, the modulator needs to bias at the top peak output power when the LO signal is removed 209. For example, if the repetitive frequency of LO is f, the frequency spacing between optical carrier and second-order mode is 2f, (see 205 in FIG. 2), while the first-order mode is suppressed. The generated mm-wave signal 205 is transmitted over a down-stream fiber 25 to a base station.

At the base station (BS), one optical coupler (CO) 26 is used to split the incoming mm-signals signals for downstream data and upstream transmission using a wavelength reused technique through the use of separating optical filters 27, 28. The downstream data are carried by the optical carrier and one of the second-order sidebands 206 via its respective, regular optical filter 28. The regular optical filter can also be located in the OC 26. Optical mm-wave signals will be detected by optical-electrical (O/E) conversion 29 before they are boosted by an electrical amplifier (EA) 201. Afterwards, the mm-wave signals are fed into a duplexer 202 and broadcasted to the customers unit by using an antenna 203. The remaining optical carrier 207 will be reused for upstream transmission while the data received by the antenna is downconverted. The down-converted upstream data are modulated in an intensity modulator IM 24 that accordingly modulates the remaining optical carrier 207 which is sent over an upstream fiber, filters 22 and received by an upstream receiver 21.

As can be seen from the exemplary ROF system of FIG. 2, the present invention provides a lower cost mm-wave generation solution due to a reduced bandwidth for an external modulator and the frequency of the RF source.

The present invention has been shown and described in what are considered to be the most practical and preferred embodiments. It is anticipated, however, that departures may be made therefrom and that obvious modifications will be implemented by those skilled in the art. It will be appreciated that those skilled in the art will be able to devise numerous arrangements and variations, which although not explicitly shown or described herein, embody the principles of the invention and are within their spirit and scope.

What is claimed is:

1. An optical wireless network comprising:
    an optical coupler for diverting received millimeter-wave signals comprised of an optical carrier and second order sidebands into multiple transmission paths;
    a downstream optical path being one of the multiple transmission paths and including an optical filter for filtering passing through the optical carrier with a single sideband, a converter for converting the optical carrier and single sideband to a corresponding electrical signal for amplification and broadcast transmission from an antenna; and
    an upstream path being one of the multiple transmission paths and having a filter for passing through the optical carrier only from the millimeter wave signals and an intensity modulator driven by data received over the antenna to modulate the optical carrier for optical transmission to a receiving destination,
    wherein the received millimeter-wave signals are generated by an intensity modulator biased at a top peak output power when a local oscillator LO signal used to generate the millimeter wave signals is removed.

2. The optical wireless network according to claim 1, wherein the received millimeter-wave signals are generated with the frequency of the optical carrier being a multiple of a local oscillator LO frequency used to generate the millimeter wave signals.

3. The optical wireless network according to claim 1, wherein the received millimeter-wave signals are generated with the frequency of the optical carrier being double of a local oscillator LO frequency used to generate the millimeter wave signals.

4. A method in an optical wireless network comprising the steps of:
    i) diverting received millimeter-wave signals comprised of an optical carrier and second order sidebands into first and second transmission paths;
    ii) over the first transmission path, passing through only the optical carrier with a single sideband from the millimeter wave signals,
    iii) converting the optical carrier and single sideband to a corresponding electrical signal for amplification and broadcast transmission from an antenna; and
    iv) over the second transmission path, passing through the optical carrier only from the millimeter-wave signals received to be modulated by an intensity modulator according to data received over the antenna for optical transmission to a receiving destination,
    wherein the received millimeter-wave signals are generated by an intensity modulator biased at a top peak output power when a local oscillator LO signal used to generate the millimeter wave signals is removed.

5. The method according to claim 4, wherein the received millimeter-wave signals are generated with the frequency of the optical carrier being a multiple of a local oscillator LO frequency used to generate the millimeter wave signals.

6. The method according to claim 4, wherein the received millimeter-wave signals are generated with the frequency of the optical carrier being double of a local oscillator LO frequency used to generate the millimeter wave signals.

* * * * *